US012658802B2

(12) United States Patent
Kozaka et al.

(10) Patent No.: US 12,658,802 B2
(45) Date of Patent: Jun. 16, 2026

(54) CONTROL CIRCUIT AND DC/DC CONVERTER

(71) Applicant: ROHM CO., LTD., Kyoto (JP)

(72) Inventors: Misaki Kozaka, Kyoto (JP); Tadashi Akaho, Kyoto (JP); Kazuma Fukatani, Kyoto (JP); Yasuto Yoshioka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 205 days.

(21) Appl. No.: 18/679,033

(22) Filed: May 30, 2024

(65) Prior Publication Data

US 2024/0405677 A1 Dec. 5, 2024

(30) Foreign Application Priority Data

Jun. 2, 2023 (JP) ................................. 2023-091612

(51) Int. Cl.
*H02M 3/158* (2006.01)
(52) U.S. Cl.
CPC .................................. *H02M 3/158* (2013.01)
(58) Field of Classification Search
CPC .................................................. H02M 3/158
See application file for complete search history.

(56) References Cited

U.S. PATENT DOCUMENTS

| | | | |
|---|---|---|---|
| 2008/0030178 A1* | 2/2008 | Leonard ................ | H02M 3/156 |
| | | | 323/282 |
| 2010/0148737 A1* | 6/2010 | Li ........................ | H02M 3/1588 |
| | | | 323/282 |
| 2017/0236488 A1* | 8/2017 | Suzuki .................. | H02M 3/157 |
| | | | 345/212 |
| 2020/0007021 A1* | 1/2020 | Chen ..................... | H02M 3/158 |
| 2020/0228011 A1* | 7/2020 | Wiktor .................. | H02M 3/158 |
| 2021/0194354 A1* | 6/2021 | Hsiao ..................... | H02M 1/08 |
| 2023/0198400 A1* | 6/2023 | Lv ........................ | H02M 1/0032 |
| | | | 323/271 |

FOREIGN PATENT DOCUMENTS

JP 2017-143708 8/2017

* cited by examiner

*Primary Examiner* — Rafael O De Leon Domenech
(74) *Attorney, Agent, or Firm* — Fish & Richardson P.C.

(57) ABSTRACT

A control circuit configured to be capable of controlling a DC/DC converter includes: a switching controller configured to be capable of controlling an output circuit of the DC/DC converter in a continuous mode where the output circuit is continuously operated and a discontinuous mode where an idle period is set, wherein the switching controller includes: a first comparator configured to output a differential signal indicating a result of comparison between a voltage based on an output voltage and a first reference voltage; an operation signal output circuit configured to output an operation signal for starting an operation of the DC/DC converter when the differential signal exceeds a predetermined level; and a corrector configured to raise a level of the first reference voltage or lower the voltage based on the output voltage after receiving a forced continuous operation signal that switches from the discontinuous mode to the continuous mode.

6 Claims, 4 Drawing Sheets

FIG. 2

CONTROL CIRCUIT AND DC/DC CONVERTER

CROSS-REFERENCE TO RELATED APPLICATION

This application is based upon and claims the benefit of priority from Japanese Patent Application No. 2023-091612, filed on Jun. 2, 2023, the entire contents of which are incorporated herein by reference.

TECHNICAL FIELD

The present disclosure relates to a control circuit and a DC/DC converter controlled by the control circuit.

BACKGROUND

A DC/DC converter including a control circuit that switches between a continuous mode in which a current flows continuously through an inductor and a discontinuous mode in which a current flows intermittently through the inductor is known in the related art.

BRIEF DESCRIPTION OF DRAWINGS

The accompanying drawings, which are incorporated in and constitute a part of the specification, illustrate embodiments of the present disclosure.

FIG. 2 is a schematic circuit diagram of an operation signal output circuit.

DETAILED DESCRIPTION

Figure 1:
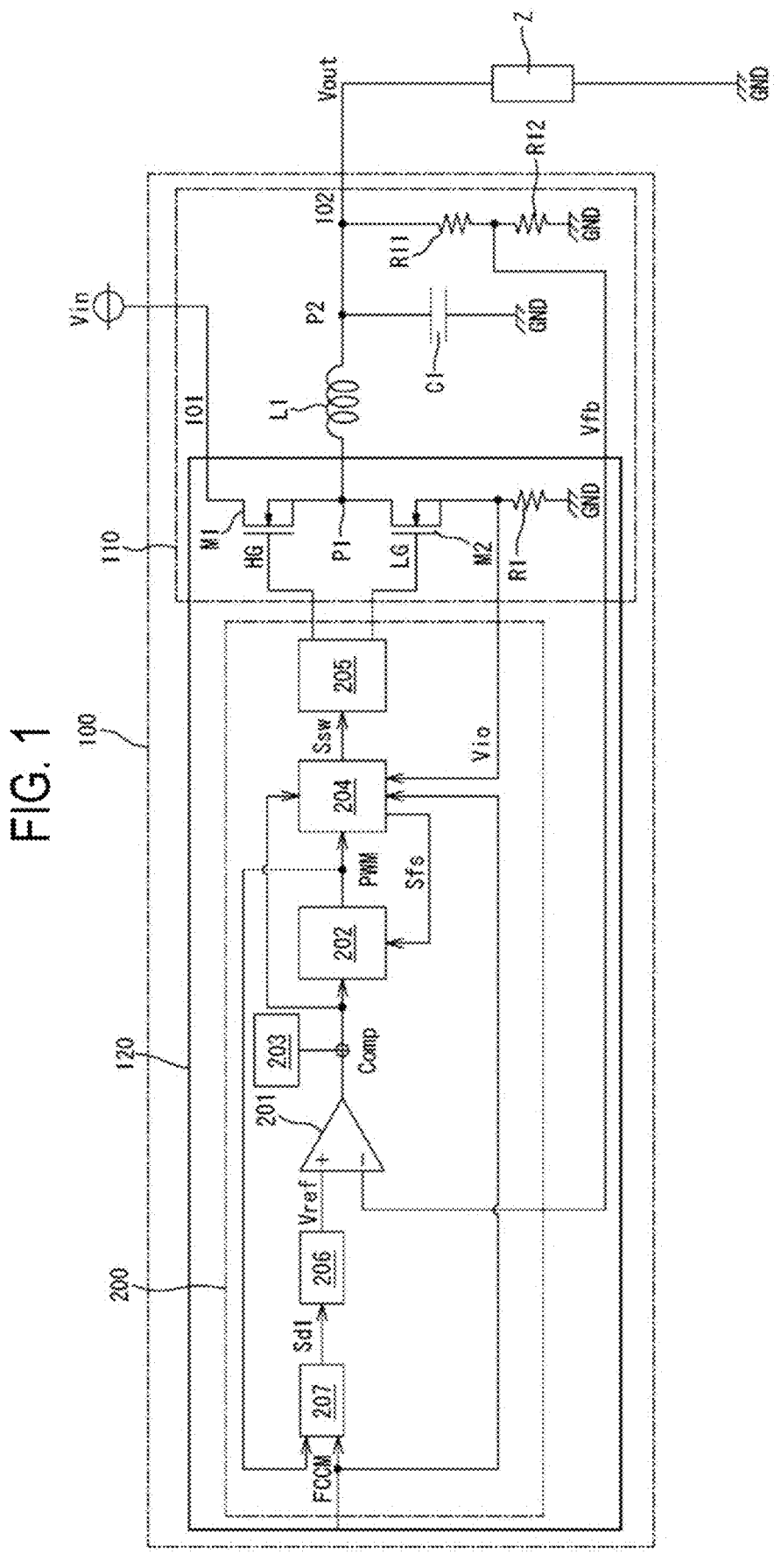
FIG. 1 is an overall configuration diagram of a switching power supply device according to an embodiment of the present disclosure.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Examples of embodiments of the present disclosure will be specifically described below with reference to the drawings. Throughout the referenced drawings, the same parts are denoted by the same reference numerals, and duplicate explanation thereof will be omitted in principle.

First, some terms used in the description of the embodiments of the present disclosure will be explained. A line refers to a wiring through which an electrical signal is propagated or applied. A ground refers to a reference conductive portion having a reference potential of 0 V (zero volts) or refers to the potential of 0 V itself. The reference conductive portion is formed of a conductor such as metal. The potential of 0 V may be referred to as a ground potential.

In the embodiments of the present disclosure, a voltage shown without any particular reference represents a potential seen from the ground.

In the present disclosure, a metal oxide semiconductor (MOS) field effect transistor refers to a transistor having a gate structure including at least three layers selected from the group of a "layer made of a conductor or a semiconductor such as polysilicon with a low resistance value," an "insulating layer," and a "P-channel type, N-channel type, or intrinsic semiconductor layer." That is, the gate structure of the MOS field effect transistor is not limited to a three-layer structure of metal, oxide, and semiconductor.

A level refers to a level of potential, with a high level (Hi level) having a higher potential than a low level (Lo level) for any signal or voltage. Any digital signal takes a signal level of Hi level or Lo level. For any signal or voltage of interest, strictly speaking, the signal or voltage being at a Hi level means that a level of the signal or voltage is the Hi level, and strictly speaking, the signal or voltage being at a Lo level means that a level of the signal or voltage is the Lo level. A level for a signal is sometimes expressed as a signal level, and a level for a voltage is sometimes expressed as a voltage level. For any signal of interest, when the signal is at a Hi level, an inverted signal of the signal takes a Lo level, and when the signal is at a Lo level, an inverted signal of the signal takes a Hi level.

In any signal that takes a signal level of Hi level or Lo level, a period during which the level of the signal is a Hi level is referred to as a Hi level period. Further, in the same signal, a period during which the level of the signal is a Lo level is referred to as a Lo level period. The same applies to any voltage that takes a voltage level of Hi level or Lo level.

When a switching transistor is in an on state, both ends of a switch are electrically connected to each other. On the other hand, when the switching transistor is in an off state, both ends of the switch are electrically disconnected from each other. Hereinafter, the on state and the off state of the switching transistor may be simply expressed as on and off, respectively. Further, a period during which the switching transistor is in an on state may be referred to as an on period, and a period during which the switching transistor is in an off state may be referred to as an off period. Further, for the switching transistor, switching from an off state to an on state may be referred to as turn-on, and switching from an on state to an off state may be referred to as turn-off.

For any transistor constituted as a field effect transistor, including a MOS field effect transistor, an on state refers to a state in which a drain and a source of the transistor are electrically connected to each other, and an off state refers to a state in which the drain and the source of the transistor are electrically disconnected from each other (cut-off state). The same also applies to transistors that are not classified as field effect transistors. Unless otherwise specified, in any MOS field effect transistor shown below, it is assumed that a back gate thereof is connected to a source thereof.

A "connection" among a plurality of parts forming a circuit, such as arbitrary circuit elements, wirings (lines), and nodes, includes not only a mechanical connection, but also an electrical connection, in other words, a state in which electricity flows. That is, "to connect" includes "to electrically connect."

<DC/DC Converter 100>

FIG. 1 is an overall configuration diagram of a DC/DC converter 100 according to an embodiment of the present disclosure. As shown in FIG. 1, a DC input voltage Vin is supplied to an input line 101 of the DC/DC converter. Further, a load Z is connected to an output line 102.

The DC/DC converter 100 receives the input voltage Vin on the input line 101 and generates a stepped-down output voltage Vout on the output line 102. The DC/DC converter 100 is configured to operate in a continuous mode which is selected mainly when the load Z is heavy and in which the DC/DC converter 100 operates continuously, and operate in a discontinuous mode which is selected mainly when the load Z is light and has a set idle period. To explain further, when the DC/DC converter 100 operates in the continuous mode, a current flows continuously through an inductor L1 which will be described later. Further, when the DC/DC converter 100 operates in the discontinuous mode, there is an idle period in which no current flows through the inductor L1. The DC/DC converter 100 includes an output circuit 110 and a control circuit 120.

<Output Circuit 110>

The output circuit 110 forms a half-bridge inverter and includes a high-side switching transistor M1, a low-side switching transistor M2, a current sense resistor R1, an inductor L1, an output capacitor C1, and resistors R11 and R12. The resistors R11 and R12 divide the output voltage Vout to generate a feedback signal Vfb according to the output voltage Vout. The feedback signal Vfb is fed back to the control circuit 120.

Herein, the high-side switching transistor M1 is an n-channel type MOS transistor. Herein, the low-side switching transistor M2 is an n-channel type MOS transistor. A drain of the high-side switching transistor M1 is connected to the input line 101. That is, the input voltage Vin is supplied to the drain of the high-side switching transistor M1.

A source of the high-side switching transistor M1 and a drain of the low-side switching transistor M2 are connected at a connection point P1. A source of the low-side switching transistor M2 is connected to a ground potential GND via the current sense resistor R1. A switching voltage Vsw is generated at the connection point P1.

A voltage drop occurs in the current sense resistor R1 according to a current flowing through the low-side switching transistor M2 (that is, a current flowing through the inductor L1) during an on period of the high-side switching transistor M1 and the low-side switching transistor M2. The voltage drop across the current sense resistor R1 is supplied to a logic circuit 204, as a detected current signal Vio.

A gate of the high-side switching transistor M1 is connected to a driver 205, which will be described later, and is supplied with a high-side voltage signal HG which will be described later. Further, a gate of the low-side switching transistor M2 is connected to the driver 205 and is supplied with a low-side voltage signal LG which will be described later. Although details will be described later, when the high-side voltage signal HG is at a Hi level, the high-side switching transistor M1 is in an on state. Further, when the low-side voltage signal LG is at a Hi level, the low-side switching transistor M2 is in an on state.

A first end of the inductor L1 is connected to the connection point P1. A second end of the inductor L1 is connected to a common connection point P2 for each channel. A first end of the output capacitor C1 is connected to the connection point P2, and a second end of the output capacitor C1 is connected to the ground potential. The connection point P2 and the first end of the output capacitor C1 are connected to the output line 102, and the output line 102 is connected to the load Z.

<Control Circuit 120>

The control circuit 120 is a functional IC (Integrated Circuit) integrated on a single semiconductor substrate. The control circuit 120 controls the high-side switching transistor M1 and the low-side switching transistor M2. Although the high-side switching transistor M1, the low-side switching transistor M2, and the current sense resistor R1 are integrated in the control circuit 120, they may be external elements of the control circuit 120.

As shown in FIG. 1, the control circuit 120 includes a switching controller 200. Details of the switching controller 200 will be described. As shown in FIG. 1, the switching controller 200 includes a first comparator 201, an operation signal output circuit 202, a holder 203, a logic circuit 204, a driver 205, a reference voltage output part 206, and a corrector 207.

<First Comparator 201>

The first comparator 201 is an error amplifier. The first comparator 201 amplifies a difference between the feedback signal Vfb according to the output voltage Vout of the DC/DC converter 100 and a first reference voltage Vref to generate a differential signal Comp.

The feedback signal Vfb is input to an inverting input of the first comparator 201, and the first reference voltage Vref is input to a non-inverting input of the first comparator 201. The first comparator 201 outputs the differential signal Comp obtained by amplifying the difference between first reference voltage Vref and the feedback signal Vfb. To explain in more detail, the first comparator 201 outputs a Lo level signal when the feedback signal Vfb is higher than the first reference voltage Vref, and outputs the differential signal Comp obtained by amplifying the difference between the feedback signal Vfb and the first reference voltage Vref when the feedback signal Vfb is lower than the first reference voltage Vref.

The holder 203 holds the differential signal Comp output from the first comparator 201 such that the differential signal Comp does not fall below a certain voltage (referred to as a holding voltage). Although details will be described later, by holding the differential signal Comp in the holder 203 such that the differential signal Comp does not fall below the certain voltage, the output voltage Vout is prevented from falling excessively.

<Operation Signal Output Circuit 202>

Figure 2:
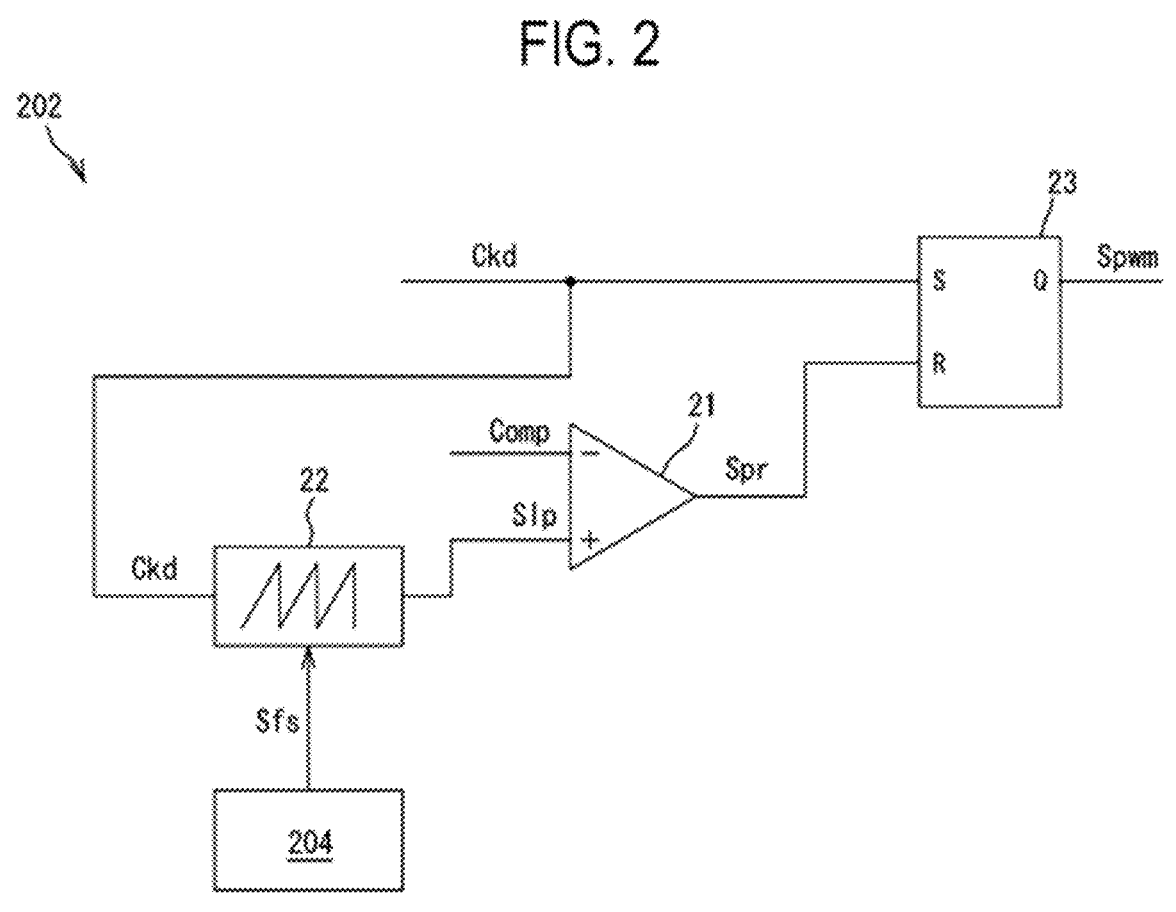

FIG. 2 is a schematic circuit diagram of the operation signal output circuit 202. As shown in FIG. 2, the operation signal output circuit 202 includes a second comparator 21, a slope circuit 22, and a PWM (Pulse Width Modulation) output circuit 23.

The slope circuit 22 outputs a second reference voltage Slp. The second reference voltage Slp is a slope signal that is, for example, a sawtooth-shaped voltage signal. A pulse clock signal Ckd is input to the slope circuit 22. Then, the slope circuit 22 generates the second reference voltage Slp in synchronization with a timing at which the pulse clock signal Ckd rises. The slope circuit 22 receives a slope fixed signal Sfs, which takes a Hi level or a Lo level, from the logic circuit 204, and when the slope fixed signal Sfs is at the Hi level, sets the second reference voltage Slp to a fixed voltage fixed to a constant value. The fixed voltage of the second reference voltage Slp is set to the same voltage as or higher voltage than the holding voltage of the differential signal Comp.

The second comparator 21 is constituted by a comparator and compares the differential signal Comp with the second reference voltage Slp. The differential signal Comp is input to an inverting input of the second comparator 21, and the slope-shaped second reference voltage Slp is input to the non-inverting input of the second comparator 21. The second comparator 21 outputs a PWM reset signal Spr indicating a result of comparison between the differential signal Comp and the second reference voltage Slp. The PWM reset signal Spr takes a Hi level when the differential signal Comp is lower than the second reference voltage Slp, and takes a Lo level when the differential signal Comp is higher than the second reference voltage Slp.

The PWM output circuit 23 is configured to include an RS latch circuit and outputs a PWM signal Spwm as an operation signal for operating the high-side switching transistor M1 and the low-side switching transistor M2.

The pulse clock signal Ckd is input to a set terminal of the PWM output circuit 23. Further, the PWM reset signal Spr is input to a reset terminal of the PWM output circuit 23. An output of the PWM output circuit 23 is the PWM signal Spwm. Although details will be described later, the PWM signal Spwm rises to a Hi level at a timing at which the pulse clock signal Ckd rises to a Hi level. At this time, since the second reference voltage Slp is smaller than the differential signal Comp, the PWM reset signal Spr is at a Lo level. Therefore, the PWM signal Spwm output from the PWM output circuit 23 is held at a Hi level.

Then, the PWM reset signal Spr has a Hi level when the second reference voltage Slp is larger than the differential signal Comp. As a result, the PWM signal Spwm output from the PWM output circuit 23 has a Lo level. That is, the PWM signal Spwm rises at the timing at which the pulse clock signal Ckd rises, and takes a Hi level during a period in which the second reference voltage Slp is larger than the differential signal Comp.

As described above, when the differential signal Comp is low, the period during which the differential signal Comp is smaller than the second reference voltage Slp becomes longer, and an on-duty ratio of the PWM signal Spwm becomes smaller. This shortens the on period of the high-side switching transistor M1 and lowers the switching voltage Vsw. As a result, the output voltage Vout becomes lower. That is, the control circuit 120 can adjust the on-duty ratio of the PWM signal Spwm to adjust the output voltage Vout by adjusting a voltage clamped by the holder 203. The PWM signal Spwm generated by the operation signal output circuit 202 is input to the logic circuit 204.

<Logic Circuit 204>

The PWM signal Spwm, a forced continuous operation signal FCCM (Forced Continuous Conduction Mode), and the differential signal Comp are input to the logic circuit 204. Based on these signals, the logic circuit 204 outputs a drive signal Ssw for driving the high-side switching transistor M1 and the low-side switching transistor M2.

The logic circuit 204 determines whether to drive the DC/DC converter 100 in the continuous mode or the discontinuous mode.

Here, the continuous mode and the discontinuous mode will be described. In the continuous mode, the high-side switching transistor M1 and the low-side switching transistor M2 repeat turn-on/off in a complementary manner continuously, in other words, without interruption.

Further, in the discontinuous mode, an operation is repeated in which the high-side switching transistor M1 and the low-side switching transistor M2 are turned on/off a certain number of times (for example, once) and thereafter enter an idle period. Further, in the discontinuous mode, instead of turning on/off the high-side switching transistor M1 and the low-side switching transistor M2 a certain number of times, for example, they may enter an idle period after the output voltage Vout reaches a certain voltage.

The logic circuit 204 generates the drive signal Ssw for on/off-control of the high-side switching transistor M1 and the low-side switching transistor M2 and outputs the same to the driver 205. The drive signal Ssw enters an SW_H state in which the high-side switching transistor M1 is turned on and the low-side switching transistor M2 is turned off. Further, the drive signal Ssw enters an SW_L state in which the high-side switching transistor M1 is turned off and the low-side switching transistor M2 is turned on.

The logic circuit 204 generates the drive signal Ssw that enters the SW_L state after the SW_H state such that the high-side switching transistor M1 and the low-side switching transistor M2 are turned on/off in a complementary manner based on the PWM signal Spwm.

The term "complementary" refers to a state in which turning-on and turning-off of the high-side switching transistor M1 and the low-side switching transistor M2 are alternately switched. When the PWM signal Spwm is at a Hi level, the drive signal Ssw is in the SW_H state and, thereafter, the drive signal Ssw is in the SW_L state for a certain period of time. That is, the logic circuit 204 sets the drive signal Ssw to the SW_H state while the PWM signal Spwm is at the Hi level. Thereafter, the logic circuit 204 sets the drive signal Ssw to the SW_L state for a certain period of time.

In the discontinuous mode, the DC/DC converter 100 has the idle period in which the high-side switching transistor M1 and the low-side switching transistor M2 do not operate. During the idle period, the logic circuit 204 sets the drive signal Ssw to Hi-Z so as to set the high-side switching transistor M1 and the low-side switching transistor M2 to high impedance.

The logic circuit 204 receives the forced continuous operation signal FCCM input from an external device. The forced continuous operation signal FCCM is a signal that takes a Hi level and a Lo level. The forced continuous operation signal FCCM takes the Hi level when the DC/DC converter 100 is in the continuous mode, and takes the Lo level when the DC/DC converter 100 is in the discontinuous mode. When receiving the Hi-level forced continuous operation signal FCCM, the logic circuit 204 determines that the DC/DC converter 100 is in the continuous mode. Further, when receiving the Lo-level forced continuous operation signal FCCM, the logic circuit 204 determines that the DC/DC converter 100 is in the discontinuous mode.

In the DC/DC converter 100, the current flowing through the inductor L1 approaches 0 A during the idle period. Then, when the current flowing through the low-side switching transistor M2 approaches 0 A, the current flowing through the inductor L1 also approaches 0 A. Utilizing this fact, the logic circuit 204 determines that the DC/DC converter 100 starts the idle period when no current flows through the inductor L1.

Therefore, the logic circuit 204 acquires the voltage drop across the current sense resistor R1 as the detected current signal Vio according to the current of the low-side switching transistor M2. Then, when the detected current signal Vio reaches a threshold value (here, 0 V), the logic circuit 204 determines that the idle state is entered, and outputs the Hi-Z drive signal Ssw.

Further, the logic circuit 204 outputs the slope fixed signal Sfs to the slope circuit 22. The logic circuit 204 outputs the Hi-level slope fixed signal Sfs when the Hi-Z drive signal Ssw is output. As described above, upon receiving the slope fixed signal Sfs, the slope circuit 22 fixes the second reference voltage Slp to a fixed voltage.

During the idle period, in other words, when the logic circuit 204 is outputting the Hi-Z drive signal Ssw, upon detecting the rise of the differential signal Comp from a held voltage value, the logic circuit 204 determines that the idle period ends. The logic circuit 204 outputs the Lo-level slope fixed signal Sfs. The slope circuit 22 restarts outputting the second reference voltage Slp whose voltage changes in a sawtooth pattern. As a result, the PWM output circuit 23 restarts outputting the PWM signal which switches between the Hi level and the Lo level. Then, the logic circuit 204 outputs the drive signal Ssw based on the PWM signal Spwm.

<Driver 205>

Based on the drive signal Ssw, the driver 205 outputs the high-side voltage signal HG to the gate of the high-side switching transistor M1 and outputs the low-side voltage signal LG to the gate of the low-side switching transistor M2. The high-side voltage signal HG is a signal that takes a Hi level or a Lo level, and the Hi level is a voltage level that turns on the high-side switching transistor M1. Similarly, the low-side voltage signal LG is a signal that takes a Hi level or a Lo level, and the Hi level is a voltage level that turns on the low-side switching transistor M2.

The high-side voltage signal HG and the low-side voltage signal LG are signals that drive the high-side switching transistor M1 and the low-side switching transistor M2 in a complementary manner, but the Hi level and the Lo level thereof are not only interchanged completely. For example, a dead time may be included in which both the high-side switching transistor M1 and the low-side switching transistor M2 are turned off. The driver 205 generates the high-side voltage signal HG and the low-side voltage signal LG such that the dead time occurs.

<Reference Voltage Output Part 206>

The reference voltage output part 206 generates the first reference voltage Vref, which is supplied to the non-inverting input of the first comparator 201. The reference voltage output part 206 normally generates a predetermined first reference voltage Vref. Further, a correction signal Sd1 is input to the reference voltage output part 206 from the corrector 207. The correction signal Sd1 is a signal that takes a Hi level and a Lo level, and when the correction signal Sd1 is at the Hi level, the reference voltage output part 206 corrects the first reference voltage Vref to a higher voltage Vref1.

<Corrector 207>

The forced continuous operation signal FCCM and the PWM signal Spwm are input to the corrector 207. Then, when detecting that the forced continuous operation signal FCCM is switched from the Lo level to the Hi level, the corrector 207 outputs the Hi-level correction signal Sd1.

Further, when the Hi-level PWM signal Spwm is confirmed after the correction signal Sd1 is output, the corrector 207 switches the correction signal Sd1 to the Lo level. The corrector 207 only needs to check the Hi-level PWM signal Spwm immediately after switching the correction signal Sd1 to the Hi level, and may recognize it when the PWM signal Spwm rises or falls.

The control circuit 120 and the DC/DC converter 100 including the same have the configurations shown above.

<Operation of DC/DC Converter 100>

Figure 3:
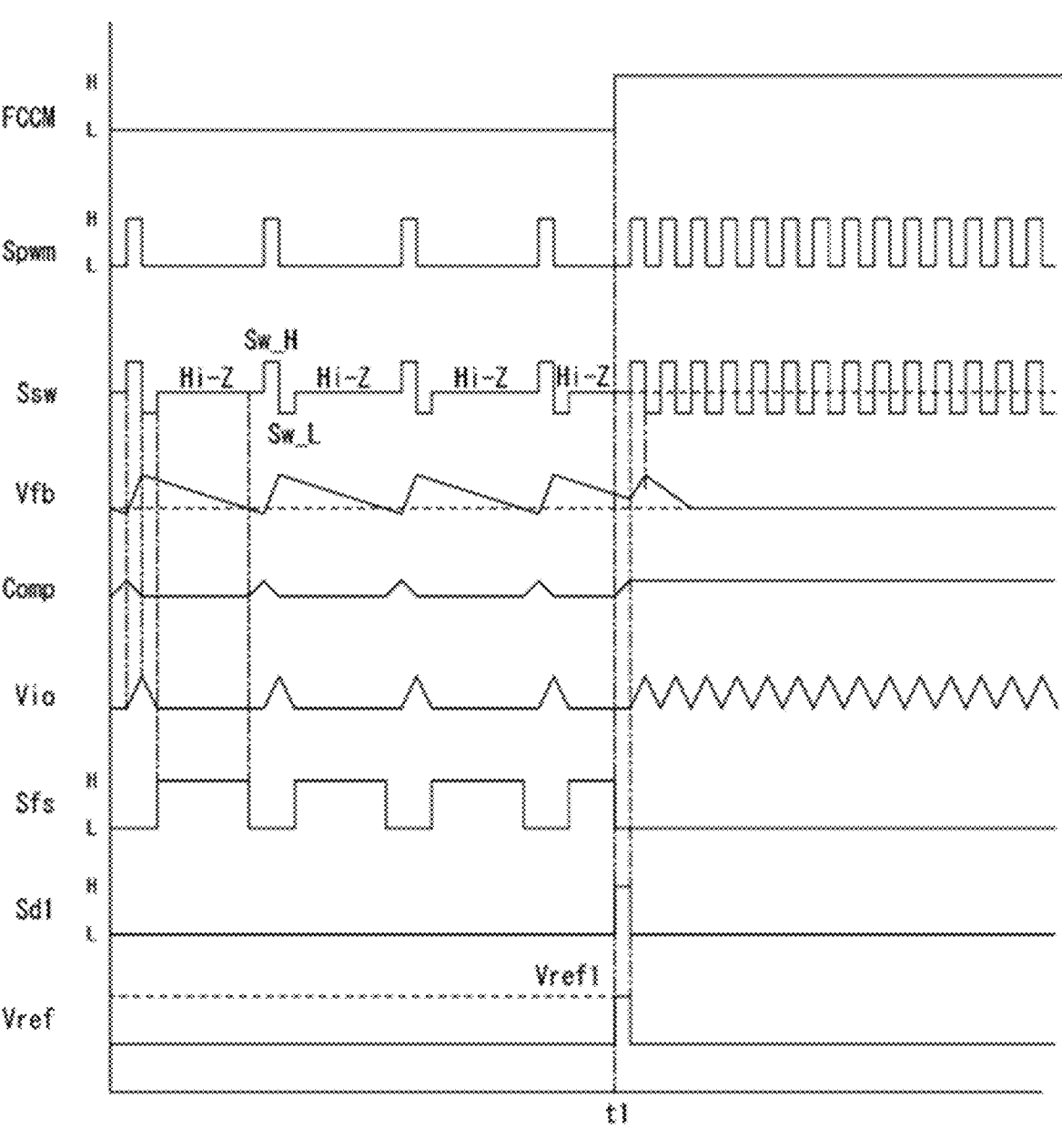
FIG. 3 is a timing chart when switching from a discontinuous mode to a continuous mode of a DC/DC converter.

Details of the operation of the DC/DC converter 100 will be described with reference to the drawings. FIG. 3 is a timing chart showing the operation of the DC/DC converter. The timing chart shown in FIG. 3 shows the forced continuous operation signal FCCM, the PWM signal Spwm, the drive signal Ssw, the feedback signal Vfb, the differential signal Comp, the first reference voltage Vref, the correction signal Sd1, and the detected current signal Vio.

In the DC/DC converter 100, the output of the load Z may fluctuate or the load Z may be replaced. For example, when the load Z changes to a heavy load, the control circuit 120 drives the DC/DC converter 100 in the continuous mode in order to increase an output current Iout. Further, when the load Z changes to a light load, the control circuit 120 drives the DC/DC converter 100 in the discontinuous mode in order to decrease the output current Iout. The DC/DC converter 100 is supplied with the forced continuous operation signal FCCM from an external device and switches between the continuous mode and the discontinuous mode based on the forced continuous operation signal FCCM.

In the example of the operation shown in FIG. 3, the forced continuous operation signal FCCM switches from the Lo level to the Hi level at time t1. That is, the DC/DC converter 100 switches from the discontinuous mode to the continuous mode at time t1.

Until time t1, the DC/DC converter 100 operates in the discontinuous mode. At this time, the logic circuit 204 has received the Lo-level forced continuous operation signal FCCM and has determined that the DC/DC converter 100 is in the discontinuous mode.

In the discontinuous mode, the logic circuit 204 generates the drive signal Ssw based on the PWM signal Spwm and outputs the same to the driver 205. When the detected current signal Vio becomes 0 V, the logic circuit 204 determines that the idle period has started. The logic circuit 204 outputs the Hi-Z drive signal Ssw to the driver 205 during the idle period.

When outputting the Hi-Z drive signal Ssw, the logic circuit 204 switches the slope fixed signal Sfs output to the slope circuit 22 from the Lo level to the Hi level. During the idle period, the feedback signal Vfb gradually decreases. Therefore, it takes time for the differential signal Comp to rise from the held voltage value. When the differential signal Comp starts rising from the held voltage value, the logic circuit 204 determines that the idle period has ended.

Then, when the differential signal Comp starts rising from the held voltage value, the logic circuit 204 switches the slope fixed signal Sfs to the Lo level. As a result, the slope circuit 22 switches from the fixed voltage to the sawtooth-shaped second reference voltage Slp. Then, the logic circuit 204 starts outputting the drive signal Ssw based on the PWM signal Spwm.

In the discontinuous mode, the logic circuit 204 repeats the operations shown above. When the forced continuous operation signal FCCM switches to the Hi level in the discontinuous mode, the logic circuit 204 determines that the mode has been switched from the discontinuous mode to the continuous mode.

The forced continuous operation signal FCCM is input to the corrector 207, and when the forced continuous operation signal FCCM switches to the Hi level, the corrector 207 switches the correction signal Sd1, which is output to the reference voltage output part 206, to the Hi level. Upon receiving the Hi-level correction signal Sd1, the reference voltage output part 206 switches the first reference voltage Vref to the voltage Vref1, which is higher than a current voltage. As a result, at time t1, the differential signal Comp output from the first comparator 201 rises from the held voltage value.

Then, when the differential signal Comp becomes larger than the second reference voltage Slp, the Hi-level PWM signal Spwm can be output. Further, in FIG. 3, the PWM signal Spwm rises to the Hi level when the differential signal Comp becomes larger than the second reference voltage Slp, but it switches to the Hi level at a timing determined by the PWM reset signal Spr and the pulse clock signal Ckd.

The reference voltage output part 206 acquires the PWM signal Spwm. When the reference voltage output part 206 detects the Hi-level PWM signal Spwm while the high voltage Vref1 is being output as the first reference voltage Vref, the reference voltage output part 206 returns the first reference voltage Vref to its original voltage value. In this way, by lowering the first reference voltage Vref, power consumption can be kept low. Thereafter, the DC/DC converter 100 operates in the continuous mode.

The reference voltage output part 206 raises the differential signal Comp by switching the first reference voltage Vref to the high voltage Vref1. This causes the timing at which the differential signal Comp rises from the held voltage value to be earlier, and as a result, a timing at which the high-side switching transistor M1 and the low-side switching transistor M2 start operating when switching to the continuous mode can be earlier.

As shown above, the DC/DC converter 100 switches between the discontinuous mode and the continuous mode based on the forced continuous operation signal FCCM which is externally supplied. Then, even when the high-side switching transistor M1 and the low-side switching transistor M2 are operated for a short period of time after receiving the forced continuous operation signal FCCM, an appropriate output voltage can be generated, such that a decrease in the output voltage can be suppressed.

Further, since the differential signal Comp is raised, even in a case where the PWM signal Spwm rising to the Hi level is generated immediately after detecting that the forced continuous operation signal FCCM has switched to the Hi level, the on-duty can be increased. This also makes it possible to suppress a voltage drop when switching from the discontinuous mode to the continuous mode.

Modifications

Figure 4:
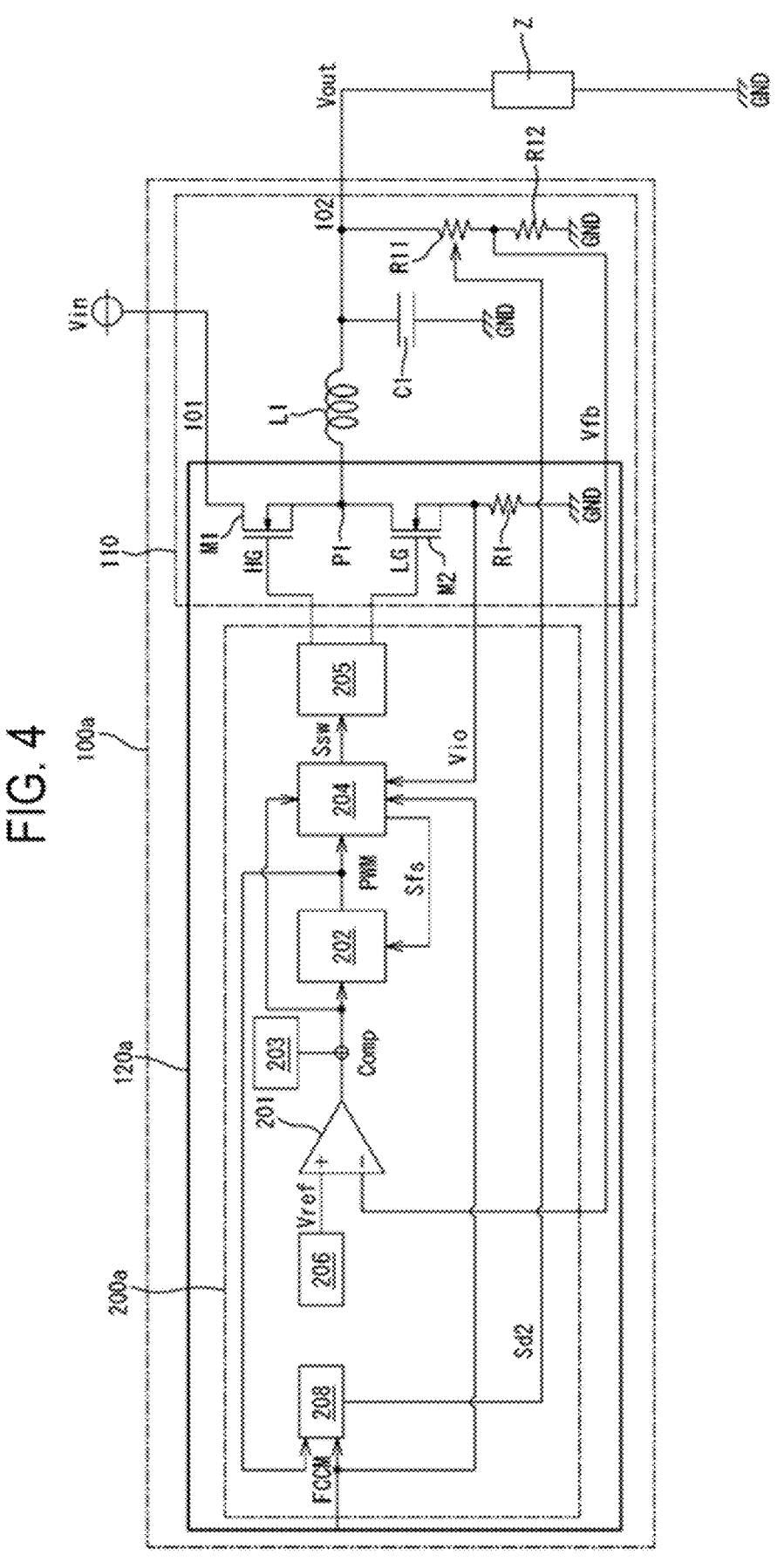
FIG. 4 is an overall configuration diagram of a DC/DC converter according to a modification of the present disclosure.

A modification of the present disclosure will be described with reference to the drawings. FIG. 4 is an overall configuration diagram of a DC/DC converter 100a according to a modification of the present disclosure. The DC/DC converter 100a of this modification is different from the DC/DC converter 100 in that the former includes a variable resistor R13 instead of the resistor R11 and a switching controller 200a of a control circuit 120a includes a corrector 208. Substantially the same parts of the DC/DC converter 100a as those of the DC/DC converter 100 are denoted by the same reference numerals, and detailed explanation thereof will be omitted.

The DC/DC converter 100a includes the variable resistor R13. The DC/DC converter 100a acquires a voltage, which is obtained by dividing the output voltage Vout by the variable resistor R13 and the resistor R12, as the feedback signal Vfb. By changing the resistance value of the variable resistor R13, the resistance value of the feedback signal Vfb can be changed. The variable resistor R13 is configured to be capable of changing its resistance value based on a correction signal Sd2 from the corrector 208.

As described above, when the forced continuous operation signal FCCM switches to the Hi level, the differential signal Comp quickly rises from the held voltage value, such that the Hi-level PWM signal Spwm can be output and the on-duty of the PWM signal Spwm can be maintained at a constant value. The differential signal Comp has a difference value between the feedback signal Vfb and the first reference voltage Vref. To explain further, the differential signal Comp is a voltage obtained by subtracting the feedback signal Vfb from the first reference voltage Vref when the first reference voltage Vref is larger than the feedback signal Vfb. Considering that the first reference voltage Vref is fixed, the differential signal Comp increases as the feedback signal Vfb decreases.

Therefore, in the DC/DC converter 100a, when receiving the fact that the forced continuous operation signal FCCM has switched to the Hi level, the corrector 208 outputs the correction signal Sd2 that increases the variable resistor R13. By doing so, it is possible to lower the voltage value of the feedback signal Vfb and raise the voltage value of the differential signal Comp.

Further, the corrector 208 acquires the PWM signal Spwm. When the corrector 208 first detects the Hi-level PWM signal Spwm after receiving the fact that the forced continuous operation signal FCCM has switched to the Hi level, the corrector 208 outputs the correction signal Sd2 that returns the variable resistor R13 to its original resistance value. By employing a configuration in which the variable resistor R13 has a constant resistance when the correction signal Sd2 is at the Lo level and the correction signal Sd2 of a constant voltage is output only when the resistance value is raised, power consumption can be reduced by outputting the correction signal Sd2.

As a result, even when the high-side switching transistor M1 and the low-side switching transistor M2 are operated for a short period of time after receiving the forced continuous operation signal FCCM, an appropriate output voltage can be generated.

Further, since the differential signal Comp is raised, the on-duty can be increased even when the PWM signal Spwm rising to the Hi level is generated immediately after detecting that the forced continuous operation signal FCCM has switched to the Hi level. This also makes it possible to suppress a voltage drop when switching from the discontinuous mode to the continuous mode.

Others

The above-described embodiments should be considered to be illustrative in all respects and not restrictive. Further, the technical scope of the present disclosure is not defined by the descriptions of the above-described embodiments but defined by the claims, and it should be understood that the technical scope of the present disclosure includes all changes that fall within the meaning and range equivalent to the claims.

The control circuit (120, 120a) described above is configured to be capable of controlling a DC/DC converter (100, 100a). The control circuit (120, 120a) has a configuration (first configuration) that includes:

a switching controller (200, 200a) configured to control an output circuit (110) of the DC/DC converter (100, 100a) in a continuous mode in which the output circuit (110) is continuously operated and a discontinuous mode in which an idle period is set, wherein the switching controller (200, 200a) includes:

a first comparator (201) configured to output a differential signal (Comp) indicating a result of comparison between a voltage (Vfb) based on an output voltage (Vout) and a first reference voltage (Vref);

an operation signal output circuit (202) configured to output an operation signal (Spwm) for starting an operation of the DC/DC converter (100, 100a) when the differential signal (Comp) exceeds a predetermined level; and a corrector (207, 208) configured to raise a level of the first reference voltage (Vref) or lower the voltage (Vfb) based on the output voltage after receiving a forced continuous operation signal (FCCM) that switches from the discontinuous mode to the continuous mode.

The control circuit (120, 120a) of the first configuration has a configuration (second configuration) that the switching controller (200) includes a PWM output circuit (23) configured to output a PWM signal (Spwm) that indicates a timing of the operation of the DC/DC converter (100), and the corrector (207) is further configured to receive the PWM signal (Spwm), perform a correction to raise the level of the first reference voltage (Vref), and then return the level of the first reference voltage (Vref) to an original level when the PWM signal (Spwm) is first detected.

The control circuit (120, 120a) of the first configuration has a configuration (third configuration) that the switching controller (200a) includes a PWM output circuit (23) configured to output a PWM signal (Spwm) that indicates a timing of the operation of the DC/DC converter (100a), and the corrector (208) is configured to receive the PWM signal (Spwm), perform a correction to lower the voltage (Vfb) based on the output voltage (Vout), and then return the voltage (Vfb) based on the output voltage to an original voltage when first detecting the PWM signal (Spwm).

The control circuit (120, 120a) of any one of the first to third configurations has a configuration (fourth configuration) that the switching controller (200, 200a) includes:

a PWM output circuit (23) configured to output a PWM signal (Spwm) that indicates a timing of the operation of the DC/DC converter (100, 100a);

a holder (203) configured to hold the differential signal (Comp) at a constant level; and a second comparator (21) configured to compare the differential signal (Comp) with a second reference voltage (Slp) different from the first reference voltage (Vref), wherein when it is detected by the second comparator (21) that the differential signal (Comp) is smaller than the second reference voltage (Slp), the PWM output circuit (23) outputs the PWM signal (Spwm).

The control circuit (120, 120a) of any one of the first to fourth configurations has a configuration (fifth configuration) that the control circuit (120, 120a) is configured to be monolithically integrated on a single semiconductor substrate.

A DC/DC converter has a configuration (sixth configuration) that the DC/DC converter is configured to include the control circuit (120, 120a) of any one of the first to fifth configurations.

According to the control circuit of the present disclosure, it is possible to quickly switch from a discontinuous mode to a continuous mode according to an instruction to do so.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit configured to be capable of controlling a DC/DC converter, comprising:

a switching controller configured to be capable of controlling an output circuit of the DC/DC converter in a continuous mode in which the output circuit is continuously operated and a discontinuous mode in which an idle period is set, wherein the switching controller includes:

a first comparator configured to output a differential signal indicating a result of comparison between a voltage based on an output voltage and a first reference voltage;

an operation signal output circuit configured to output an operation signal for starting an operation of the DC/DC converter when the differential signal exceeds a predetermined level; and a corrector configured to raise a level of the first reference voltage or lower the voltage based on the output voltage after receiving a forced continuous operation signal that switches from the discontinuous mode to the continuous mode.

2. The control circuit of claim 1, wherein the switching controller includes a PWM output circuit configured to output a PWM signal that indicates a timing of the operation of the DC/DC converter, and wherein the corrector is further configured to receive the PWM signal, perform a correction to raise the level of the first reference voltage, and then return the level of the first reference voltage to an original level when the PWM signal is first detected.

3. The control circuit of claim 1, wherein the switching controller includes a PWM output circuit configured to output a PWM signal that indicates a timing of the operation of the DC/DC converter, and wherein the corrector is further configured to receive the PWM signal, perform a correction to lower the voltage based on the output voltage, and then return the voltage based on the output voltage to an original voltage when the PWM signal is first detected.

4. The control circuit of claim 1, wherein the switching controller includes:

a PWM output circuit configured to output a PWM signal that indicates a timing of the operation of the DC/DC converter;

a holder configured to hold the differential signal at a constant level; and a second comparator configured to compare the differential signal with a second reference voltage different from the first reference voltage, wherein when it is detected by the second comparator that the differential signal is smaller than the second reference voltage, the PWM output circuit outputs the PWM signal.

5. The control circuit of claim 1, wherein the control circuit is configured to be monolithically integrated on a single semiconductor substrate.

6. A DC/DC converter configured to include the control circuit of claim 1.

* * * * *